May 8, 1962 — J. A. McNALLY ET AL — 3,034,059
ANGULAR POSITION ERROR INDICATOR APPARATUS FOR SYNCHRO SERVO SYSTEMS
Filed July 10, 1959 — 3 Sheets-Sheet 1
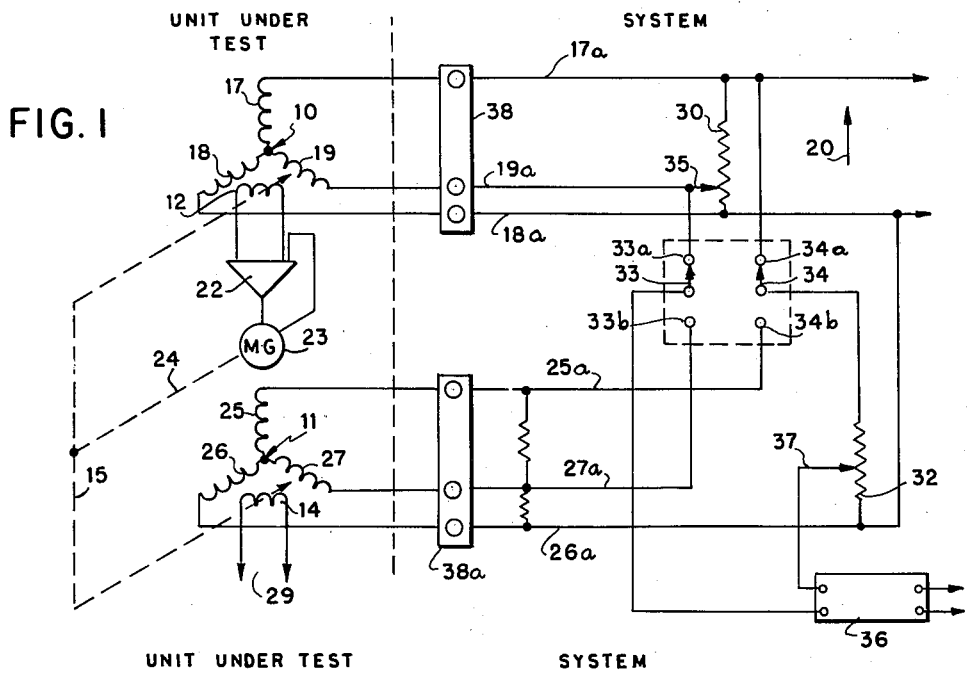
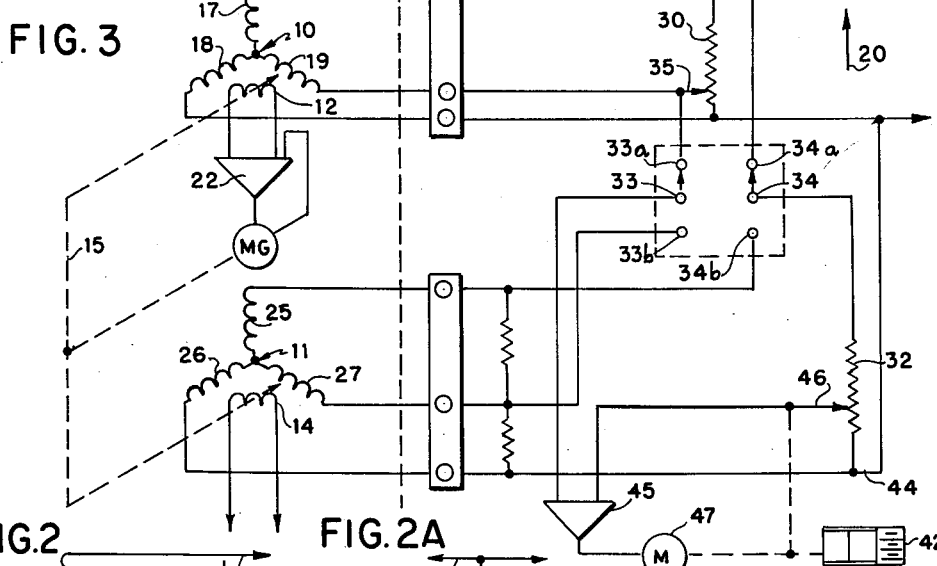
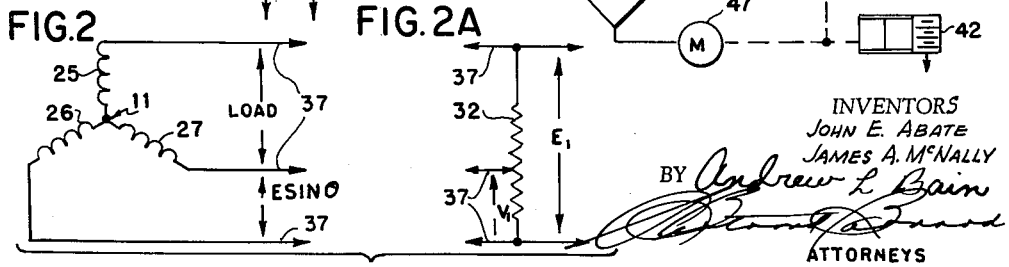
INVENTORS
JOHN E. ABATE
JAMES A. McNALLY
BY
ATTORNEYS

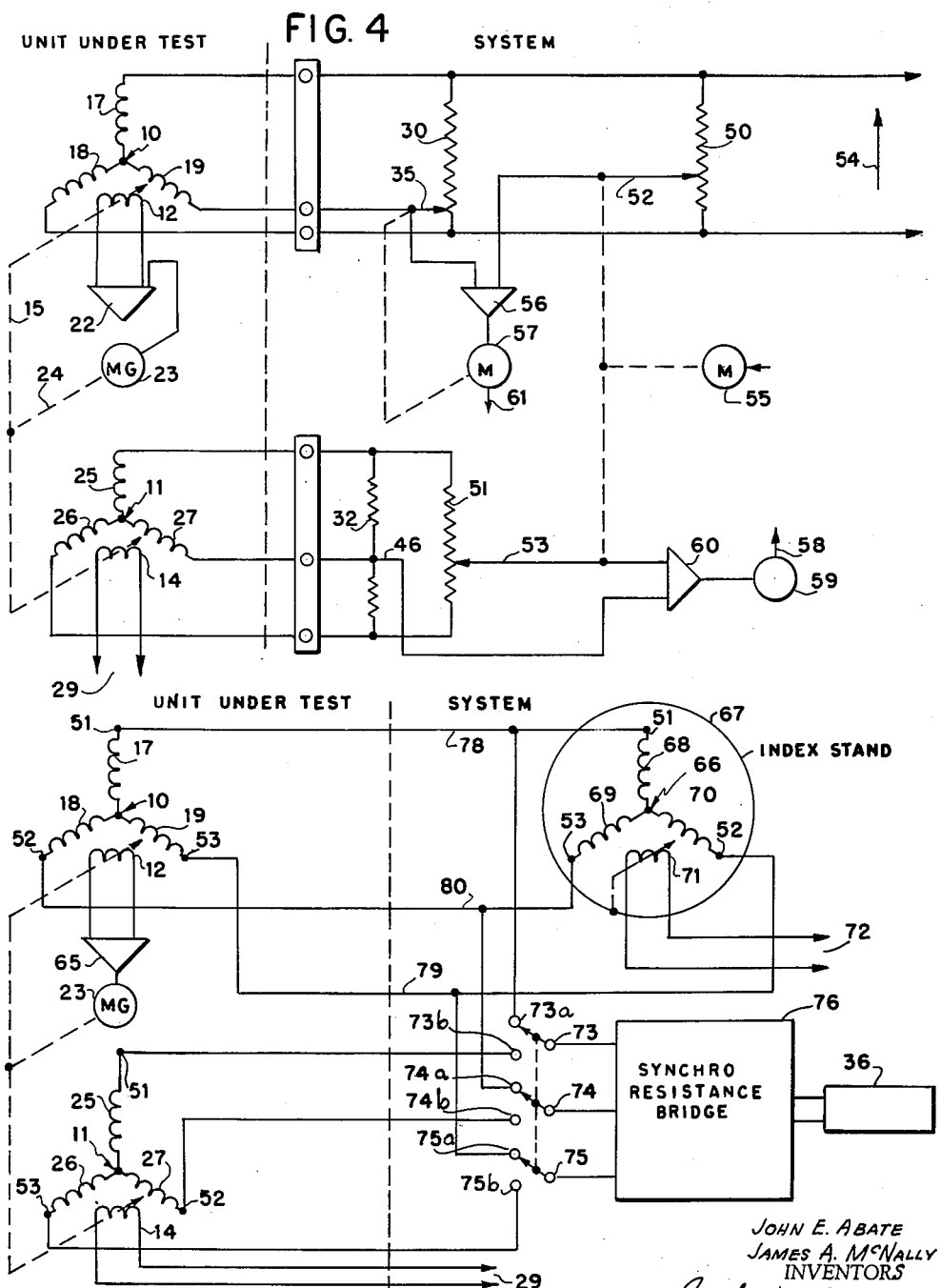

INVENTORS
JOHN E. ABATE
JAMES A. McNALLY
BY Andrew L. Bain

ATTORNEYS

United States Patent Office 3,034,059
Patented May 8, 1962

3,034,059
ANGULAR POSITION ERROR INDICATOR APPARATUS FOR SYNCHRO SERVO SYSTEMS
James A. McNally, Upper Montclair, and John E. Abate, West Orange, N.J., assignors to General Precision, Inc., a corporation of Delaware
Filed July 10, 1959, Ser. No. 826,290
11 Claims. (Cl. 324—158)

This invention relates to synchro servo systems and synchro components and is particularly directed to means for electrically testing the angular accuracy of transmission of such servo systems, and for testing the angular accuracy of synchro components.

Synchro servo systems are generally used for transmitting rotational angular motions from one point to one or more remotely located points by means of an electrical or combination electrical and mechanical servo system. The angular motions to be transmitted are generally applied to the rotating armature of a synchro control transmitter or some modification thereof, which generates three output voltages which are representative of the angular position of the armature relative to the stator or a fixed starting position.

These voltages are transmitted through an electrical circuit to a synchro control transformer, which develops an output voltage that is determined by the difference between its actual shaft position and the position of the shaft of the transmitter. The output voltage of the synchro conrol transformer is in turn used to control a positioning servo which sets the control transformer shaft at the same time that it positions a load.

The combination of synchro control transformer, positioning servo, and load constitute a synchro servo repeater system, that is, a system whose output or load is a repeat or an identical transmission of the angular information placed into the synchro control transformer. This synchro servo repeater system is oftentimes referred to as simply a synchro servo system.

Due to the large number of components that frequently enter into such a servo repeater system, and the gear trains and other transmission means entering into the positioning servo system, inaccuracies appear at various points in the system which contribute to an overall error in the transmission of angular information to the load.

In accurate servo systems, such as those used in the navigation of aircraft, guided missiles and ships, these errors, even though they may be relatively small are magnified and may result in serious errors in navigation and operation of the aircraft, or guided missile, or ships.

It is therefore necessary that an accurate test be made of the angular deviations of the load of the system, relative to the driving angle of the synchro control transmitter, in order to determine the acceptability of the synchro servo system in accordance with established standards, or to arrange for compensation for such angular deviations at various angular positions.

In the usual synchro servo system, these tests are conducted by employing an index stand and a synchro control transmitter for establishing the angular increments of input to the servo repeater, and employing a synchro resistance bridge, with a phase-sensitive voltmeter as a nulling device.

Since the index stand, synchro transmitter, and resistance bridge are combined to reference and determine input as well as output angular information, all three contribute to the source of error in the measurement of angular transmission error. The accuracy of the test, then, is dependent upon the combined accuracy of the index stand, synchro transmitter, and resistance bridge, over the range in which the test is made.

This type of testing is of necessity costly, inconvenient and limited in scope and is not particularly satisfactory for production testing of synchro servo systems.

The primary features of this invention are to reference and measure all angular increments both output and input with a single high resistance, high resolution, and high accuracy potentiometer used as a reference device, and to simulate the electrical output and angular position of the synchro control transmitter with a single low resistance, high resolution potentiometer used as an excitation device.

The system represented by this invention represents a convenient, relatively inexpensive apparatus, capable of measuring to a relatively high degree of accuracy, the error in angular position of a synchro servo system, at increments throughout the entire range of synchro rotor movement, or 360°.

In addition, this system is equally applicable to synchro components, such as synchro transmitters, synchro receivers, and resolvers.

The accompanying drawings, illustrative of one embodiment of the invention, and several modifications thereof, together with the description of their construction, the circuitry and the method of operation, control, coordination and utilization thereof, will serve to clarify further objects and advantages of the invention.

In the drawings:

FIGURE 1 is a simplified schematic diagram of the basic circuit of the angular transmission error indicator, showing the synchro servo system under test, the excitation potentiometer, the reference potentiometer, the switches used for transferring the circuitry from one hook-up to another and a phase sensitive voltmeter.

FIGURE 2 is a schematic diagram showing a comparison between a synchro transmitter, and the potentiometer, which electrically simulates the angular position of the rotor of the synchro transmitter.

FIGURE 3 is a modification of the schematic diagram shown in FIGURE 1, for testing essentially the same synchro servo system, with an auxiliary servo loop incorporated, and an error indicator, driven by the motor of the auxiliary servo loop, for indicating directly the angular input and output of the synchro servo system under test.

FIGURE 4 is a simplified schematic wiring diagram of another modification of the basic circuit shown in FIGURE 1, but instead of manual operation, is entirely automatic. It shows a pair of reference potentiometers, the adjustable contact arms of which are mechanically coupled, substituted in place of the transfer switches and the single reference potentiometer shown in FIGURE 1, and also shows a servo loop driven by the adjustable contact arms of one reference potentiometer and the excitation potentiometer, and an X-axis plotter driven by the motor coupled to the arms of the reference potentiometers. The transmission error of the system is then the error axis plotter input.

FIGURE 5 is a schematic wiring diagram of the conventional method of determining the error angle of transmission of a synchro servo system, showing an auxiliary synchro transmitter, connected to the synchro control transformer under test, the rotor of the auxiliary synchro transmitter being mounted on a rotary index stand, a synchro resistance bridge selectively connected to the stator coils of the auxiliary synchro transmitter, and the synchro transmitter of the synchro servo system under test, and a phase sensitive voltmeter connected to the synchro resistance bridge.

Figure 6:
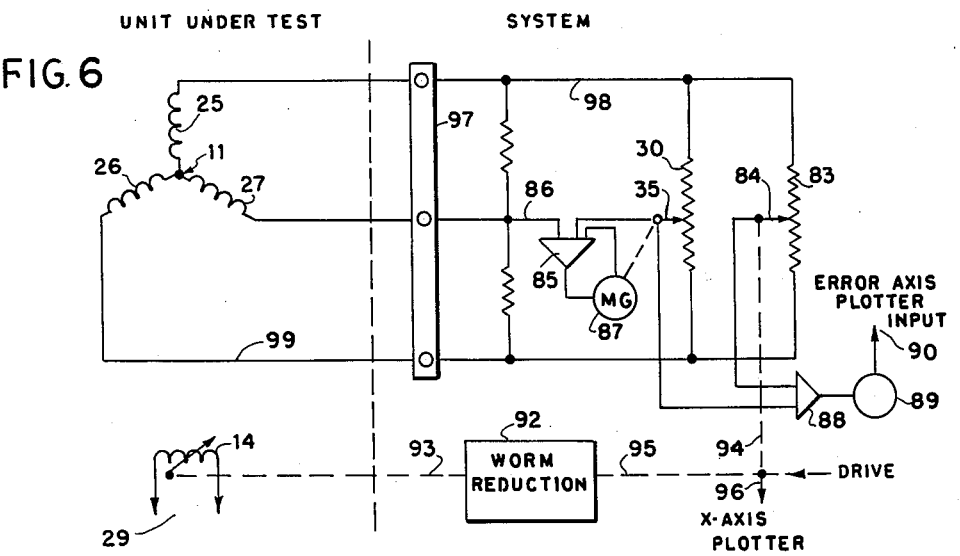

FIGURE 6 is a simplified schematic diagram of a continuous automatic synchro tester for testing an individual synchro, showing a synchro transmitter under test, an excitation potentiometer and the reference potentiometer, a servo loop connected into the line connecting one field coil of the synchro transmitter with the adjustable contact arm of the excitation potentiometer, a worm reduction drive incorporated between the adjustable contact of the reference potentiometer and the rotor of the synchro transmitter under test, an error axis plotter input controlled by the output of the adjustable contact arm of the excitation and reference potentiometers, and an error axis plotter driven by the same motor that drives the worm reduction drive.

Figure 7:
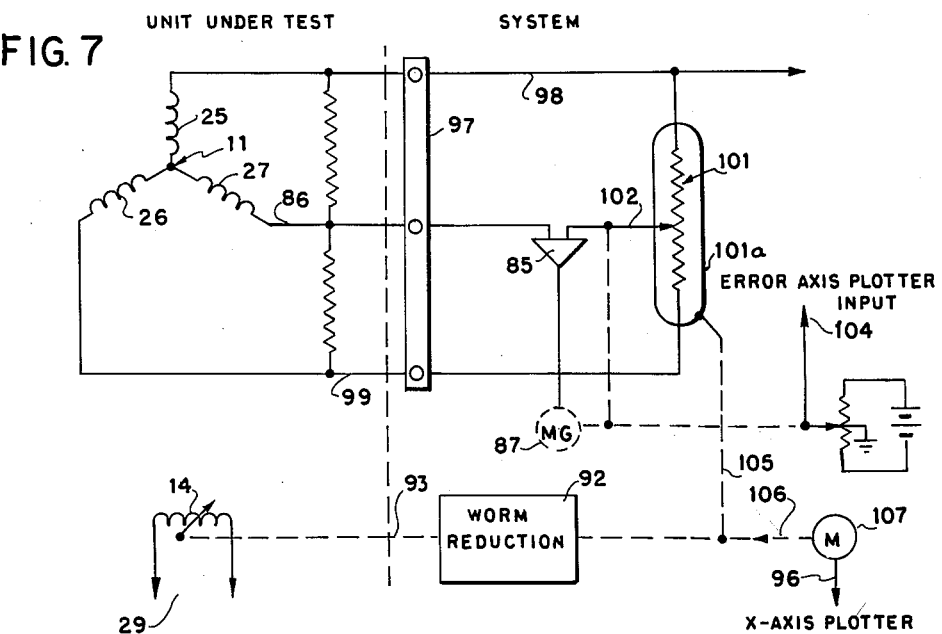

FIGURE 7 is a schematic diagram of a modification of the circuit shown in FIGURE 6 for testing an individual synchro, showing a differential potentiometer fitted with a rotary stator winding substituted in place of the two potentiometers shown in FIGURE 6, a worm driven reduction gear incorporated between the rotary stator of the potentiometer and the armature rotor of the synchro transmitter under test, a servo loop incorporated into the line connecting one coil of the synchro under test, with the adjustable contact arm of the potentiometer, an error axis plotter driven by the same motor that drives the worm reduction gear, and an error output potentiometer yielding the error axis plotter input.

It will be understood that the following description of the construction and the method of mounting, wiring, operation, control, coordination and utilization of the synchro angular position error indicator, is intended as explanatory of the invention and not restrictive thereof.

In the drawings, the same reference numerals designate the same parts throughout the various views, except where otherwise indicated.

In the basic circuit shown in FIGURE 1, a synchro servo system including two synchros, a synchro control transformer 10(CT) and a synchro transmitter 11(CX) are utilized, the rotor armature 12 of the control transformer 10 being directly coupled to the rotor armature 14 of the synchro transmitter by a shaft, or other coupling means 15, shown by the dotted lines, FIGURE 1.

The stationary field of the synchro control transformer 10 comprises three coils 17, 18, 19, having their magnetic axes equally spaced about the axis of the armature rotor 12. The coils 17, 18, 19 are Y-connected to a common connection at the center.

The voltage from an external source 20 is fed to two of the field coils 17, 18 of the control transformer 10, and to the excitation potentiometer 30 which serves as a CX simulator and distributes the voltage through the field coils 17, 18, 19 of the synchro control transformer, in a manner hereinafter described in greater detail.

The same voltage from the source 20 is also fed to the reference potentiometer, through the terminals of a double-pole, double-throw switch, when the switch is in the upper position shown in FIGURE 1, in a manner hereinafter described in greater detail.

The voltage distribution through the field coils 17, 18, 19 of the synchro control transformer, as received from the excitation potentiometer, determines the rotational angular position of the armature rotor 12 of the control transformer.

The voltage from the armature of the control transformer 10 is fed to an amplifier 22, the amplified voltage being fed to a motor generator 23, the shaft of which is directly mechanically coupled to the coupling means 15, by an intermediate coupling 24, shown by dash lines, FIGURE 1.

By directly mechanically coupling the shafts of the armature rotor 12 of the synchro control transformer 10(CT) with the shaft of the synchro transmitter 11(CX) through the motor of the motor generator 23, the angular position of the rotor of the synchro transmitter 11(CX) is co-ordinated with that of the synchro transformer 10(CT) at all times.

The voltage generated by the generator end of the motor generator 23, is fed back to the amplifier to provide damping for the servo loop consisting of 12, 22, 23, 24, and 15.

The stationary field of the synchro transmitter also comprises three coils 25, 26, 27, which are located in the same relative positions as those of the control transformer 10(CT).

The armature rotor 14 of the synchro transmitter 11(CX) is energized by the rated voltage which is fed from the source 29.

A low resistance, high resolution excitation potentiometer 30 is connected across two of the field coils 17, 18 by the lines 17a, 18a, the potentiometer 30 serving as an excitation device for the synchro servo system control transformer 10(CT) input.

A high resistance high resolution, high linearity potentiometer 32 is provided as a reference for the excitation potentiometer 30, a double-pole double-throw switch 33, 34 being provided to directly couple the reference potentiometer 32 with the excitation potentiometer 30, when the switch 33, 34 is in the upper position 33a, 34a.

One of the stator field coils 26 of the synchro transmitter is connected to the end of the coil of the reference potentiometer 32, which is opposite the end connected to the switch 34. The mating stator field coil 18 of the control transformer 10(CT) is also connected to the same end of the potentiometer coil 32.

The third stator coil 19 of the synchro control transformer 10, is connected to the adjustable slide or rotary contact 35 of the potentiometer 30, which is also connected to the upper terminal 33a of the second pole 33 of the double-pole switch shown in FIGURE 1.

A phase sensitive voltmeter 36 is connected to the slider contact 37 of the reference potentiometer 32, the other terminal of the voltmeter being connected to the central terminal of the switch 33.

The reference potentiometer 32 is used as a reference for the potentiometer 30, when the switch 33, 34 is in the position 33a, 34a, shown in FIGURE 1.

The potentiometer transfer constant $K_1$ of potentiometer 32 is adjusted by means of the sliding contact 37, to simulate any desired angle, which is the angle $\theta$ between the axis of the rotor of the synchro transmitter, relative to a fixed or starting position on the stator thereof, where $$\text{Angle } \theta = \text{arc tan } \frac{\sqrt{3K_1}}{2-K_1}$$

or $$K_1 = \frac{2}{1+\sqrt{3} \cot \theta}$$

When the switches 33 and 34 are in the lower position 34b, the coil of the reference potentiometer 32 is placed across two of the coils 25, 26, forming two legs of the stator of the synchro transmitter 11(CX), and the phase sensitive voltmeter 36 is connected between the third synchro transmitter coil 27 and the slider 37 of the reference potentiometer 32. If the phase sensitive voltmeter does not indicate a null, there is an error in the synchro servo system under test. One of several methods can be used to determine the error.

(1) The slider 37 of the reference potentiometer 32 may be adjusted until the phase sensitive voltmeter reads null. The difference between the new and old slider positions of the auxiliary potentiometer 32 is an indication of the error angle.

(2) If the error angle is small, the phase sensitive voltmeter 36 can be calibrated to read error angle directly, as the voltage is proportional to the error angle.

*Procedure*

The switch 33, 34 is placed in the position 33a, 34a, with the reference potentiometer slider 37 set at some pre-determined value of constant $K_1$.

The sliding contact 35 of the potentiometer 30 is adjusted until the voltmeter reads null.

The switch 33, 34 is placed in the second position 33b, 34b.

The error in the synchro system under test is determined by one of the methods described above.

The switch configuration shown in FIGURE 1, shows the switching arrangement for obtaining a simulated angle of between 0° and 60°.

In order to obtain a simulated angle of between 60° and 120°, 120° to 180°, or any other 60° range between 0° and 360°, the stator windings 17, 18, 19, and 25, 26, 27 of the synchros under test are re-connected in order to obtain the desired angular range in a manner hereinafter described.

A switching mechanism 38, 38a, which is operative to transfer the circuitry controlling the particular 60° angular range of synchro rotor movement, which is fed to the potentiometers 30 and 32, is incorporated into the lines 17a, 18a, 19a connecting the field coils of the synchro control transformer 10(CT) with the coil and the slider or rotary contact arm 35, of the potentiometer 30 respectively, and the lines 25a, 26a, 27a, connecting the field coils 25, 26, 27 of the synchro transmitter 11(CX) with the coil and the rotary contact 37 of the reference potentiometer 32 in the manner shown schematically in FIGURE 1.

The switching mechanism may be a series of push buttons or switches, each covering a particular 60° angular range, or a rotary switch, or other suitable type of selector switch having six control positions.

A series of push button controlled switches, a switching dial, or other suitable switching arrangement may be provided for this purpose, each push button controlling one angular range of 0° to 60°, or any 60° increment to 360°.

*Analysis of Continuous Angle Position Error Indicator, Type 1*

Since the auxiliary potentiometer 32($R_1$) is the only reference standard in the entire system, the inaccuracies of the system will be due to the inaccuracies of $R_1$ only. The analysis will therefore be based on $R_1$.

FIGURES 2 and 2a show a schematic wiring circuit of a portion of the schematic circuit shown in FIGURE 1.

This shows the connections to the control transmitter 11(CX) and the reference potentiometer 32.

(1) $$K_1 = \frac{V_1}{E_1}$$

where $K_1$ is the transfer constant of the potentiometer 32.

If the auxiliary potentiometer 32($R_1$) is to simulate the synchro transmitter 11(CX) shown in the schematic wiring circuit, FIGURE 1, the following must be true.

(2) $$K_1 = \frac{E \sin \theta}{E \sin \theta + E \sin (\theta + 120°)}$$

By simplification $K_1$ becomes (3) $$K_1 = \frac{2}{1 + \sqrt{3} \cot \theta}$$

solving for $\theta_1$ (4) $$\theta_1 = \tan^{-1} \frac{\sqrt{3}(K_1)}{2 - K_1}$$

Plotting K against $\theta$ for a $\theta$ range from 0° to 60°, the values of K range from $\theta$ at 0° to .500 at 30°, and 1.000 at 60°, the actual values over the entire range being given in the curve.

Error due to non-linearity of auxiliary potentiometer 32($R_1$)

(5) $$L = \text{linearity} = \frac{D}{R_1} \text{ by definition}$$

where $D$ = deviation resistance.

(6) $$K = \text{actual transfer constant} = \frac{K_1 R_1 + D}{R_1} = K_1 + \frac{D}{R}$$

(7) $$K = K_1 \pm L$$

Let $e_L$ = simulated angular error due to non-linearity (8) $$e_L = \theta_1 - \theta$$

Where $$\phi_1 = \tan^{-1} \frac{\sqrt{3K_1}}{2 - K_1}$$

$$\phi = \tan^{-1} \frac{\sqrt{3K}}{2 - K}$$

$\phi$ = actual angle simulated (9) $$\tan e_L = \tan (\theta_1 - \theta) = \frac{\tan \theta_1 - \tan \theta}{1 + \tan \theta_1 \tan \theta}$$

By substitution and simplification, $e_L$ becomes

(10) $$e_L = \tan^{-1} \pm \frac{\sqrt{3} \times L}{2(K - K^2 - 1) \pm L(1 - 2K)}$$

A variation of the apparatus shown in FIGURE 1 and hereinbefore described, is used in conjunction with the servo-mechanism of an angle position indicator.

The modification circuit shown in FIGURE 3 is substantially the same as the basic circuit shown in FIGURE 1, except that a motor driven error indicator 42 is substituted in place of the phase sensitive voltmeter 36 shown in FIGURE 1.

The rotors of the two synchros, a synchro control transformer 10(CT), and a synchro transmitter 11(CX) are mechanically coupled to one another in the same manner as those shown in FIGURE 1.

The rated voltage is fed from an external source 20 to two of the field coils 17, 18 of the synchro transformer 10(CT) to the potentiometer 30, and the adjustable contact of the primary potentiometer 30 distributes the voltage through the field coils 17, 18, 19, of the synchro control transformer 10, in substantially the same manner as that shown in FIGURE 1.

The same voltage is fed to the coil of the reference potentiometer 32 through two terminals of the double-pole double-throw switch 33, 34, when the switch is in the upper position shown in FIGURE 3 in substantially the same manner as that shown in FIGURE 1.

The three field coils 17, 18, 19 of the synchro transformer 10(CT) are connected to the potentiometer 30, and the sliding contact 35 thereof, in substantially the same manner as those shown in FIGURE 1.

The servo loop, including the amplifier 22 and the motor-generator 23, connected thereto, are substantially the same as those shown in FIGURE 1.

The three coils 25, 26, 27 of the stationary field of the synchro transmitter, are substantially the same as those shown in FIGURE 1.

The potentiometer 30 is substantially the same as that shown in FIGURE 1 and is connected to the field coils of the synchro transformer in the same manner as that shown in FIGURE 1.

The reference potentiomer 32 is connected to the central terminal of the switch 34 in the same manner as that shown in FIGURE 1. The opposite end of the potentiometer coil 32 is connected to the line 44, connecting one of the field coils 26 of the synchro transmitter 11(CX) to one end of the external source.

A servo system including an amplifier 45 is inserted between the central terminal of the switch 33, and the adjustable rotary contact 46 of the auxiliary potentiometer.

The amplified voltage from the amplifier 45 drives a motor 47, which is directly coupled to an error indicator 42, which directly indicates the error angle on a dial in minutes and seconds of angle.

The adjustable rotary contact 46 of the auxiliary potentiometer 32 is mechanically coupled to the motor 47 and the error indicator 42, so that the error indicator actually shows the angular position of the rotary contact 46 of the potentiometer 32.

Operation

The switch 33, 34, is moved into the upper position 33a, 34a, shown in FIGURE 3 with the reference potentiometer constant $K_1$ set at some predetermined value corresponding to some angle θ.

With the switch 33, 34 in this position, the slider 35 of potentiometer 30 is adjusted until the error indicator 42 indicates zero error.

When the switch 33, 34 is moved to the second position 33b, 34b, the error signal, which is the difference between the voltage through the third stator winding 27 of the synchro transmitter 11 and the voltage at the adjustable rotary contact 46 of the reference potentiometer 32, is sent to the angle position error indicator. If this error signal is not zero, the amplified voltage from the amplifier 45 will drive the motor 47, the shaft of which is common with that of the adjustable rotary contact 46 of the reference potentiometer 32, until the adjustable contact 46 reaches a position at which the value of the constant $K_1$ is such as to make the error signal zero. Since the shaft of the motor 47 also drives the error indicator 42, the angle error of the synchro servo system under test is read directly in minutes and seconds on the error indicator 42.

The accuracy of this system is substantially the same as that shown in FIGURE 1. In addition, the unit under test is not subjected to a loading error, as it would be, for instance, if a standard angle position indicator with a control transformer, or a synchro differential input were used.

Another variation of the system shown in FIGURE 1, employs the essentials of the circuit shown in FIGURE 1, to form a servo system, the purpose of which is to plot a continuous angle error curve of a synchro servo system under test from 0° to 360°. The apparatus, a schematic wiring circuit of which is shown in FIGURE 4, therefore allows a continuous error curve of the servo system under test to be obtained automatically, quickly, and to a high degree of accuracy.

This modified type of apparatus, is probably the most important of all the circuits shown, as it is readily adaptable to full automatic use, with a consequent reduction in testing time, and an increase in production over a definite period, coupled with an improvement in accuracy.

Description

In place of the switch 33, 34 shown in FIGURE 1, two potentiometers 50, 51, the shafts supporting the rotary contacts 52, 53 of which are mechanically common, and whose transfer constants $K_1 = K_1$ are equal, are used.

The rated voltage is fed from an external source 54 to two of the field coils 17 and 18 of the synchro transformer 10(CT), and to the excitation potentiometer 30, which distributes the voltage through the field coils 17, 18, 19 of the synchro control transformer 10(CT), in a manner similar to that shown in FIGURE 1.

The same voltage is also fed to the potentiometer 50.

The shafts 52, 53 of the rotary contacts of the potentiometers 50, 51 are driven by a relatively slow speed motor 55.

Since the speed of the motor 55 is relatively low, the servo loop consisting of an amplifier 56, an auxiliary motor 57, driven by the amplified voltage from the amplifier 56, which represents the amplified voltage signals from the rotary contact 35 of the excitation potentiometer 30, and that from the rotary contact 52 of the potentiometer 50, has ample time to reach a stable null at any instantaneous position of the rotary contact 52 of the potentiometer 50.

In this manner, the control transformer 10(CT) of the synchro servo system under test is driven by an excitation device, or synchro transmitter simulator, whose transfer constant is $K_1$ or $K_1$.

The output of the synchro transmitter 11(CX) of the synchro system under test is compared to the reference input $K_1$ from the reference potentiometer 51, and the angular difference, which is the error angle, is recorded by means of an error axis (Y axis) plotter 58, shown in FIGURE 4, which is in turn driven by a motor 59, the amplified voltage to which is supplied by a phase sensitive amplifier 60, which is connected between the adjustable rotary contact 53 of the potentiometer 51, and one of the field coils 27 of the synchro transmitter 11(CX). In order for this signal difference to represent the true angle error, the speed of response of the synchro servo loop under test must be faster than either the drive input speed or the speed of the motor 57 of the auxiliary servo loop.

If the motor 57 is also used to control a θ axis or X-axis plotter 61, a continuous relationship between the angular arc and the synchro system error angle can quickly and accurately be obtained.

With various modifications, the circuit shown in FIGURE 1 can be used for calibrating individual synchros, such as synchro transformers, synchro transmitters, synchro differentials, and if the synchro servo system under test includes a number of synchro transmitters, the angle error curves of these synchro transmitters can be obtained simultaneously, if a multichannel recorder is used in place of the plotters 58 and 61.

The conventional method now generally in use for testing synchro servo systems, such as those shown in FIGURE 1, and the other schematic circuits, is shown in the drawings, FIGURE 5.

The unit under test is substantially the same as that shown in FIGURE 1, and includes two synchros, a synchro control transformer 10(CT) and a synchro transmitter 11(CX), the rotor armature 12 of the synchro control transformer being mechanically coupled directly to the rotor armature 14 of the synchro transmitter in the same manner as that shown in FIGURE 1.

The stationary field coils 17, 18, 19, of the synchro control transformer are substantially the same as those shown in FIGURE 1, and are connected in the same manner.

The servo loop formed at the synchro control transformer 10(CT) is substantially the same as that shown in FIGURE 1.

The armature 14 of the synchro transmitter 11(CX) is energized by a voltage fed from the source 29, in substantially the same manner as that shown in FIGURE 1.

The voltage from the armature rotor 12 of the synchro control transformer 10(CT) which is received from the field coils 17, 18, 19 of the stator, is fed to a phase sensitive amplifier 65, the amplified voltage being fed to a motor generator 23, the shaft of which is directly coupled to the shaft connecting the rotor 12 of the synchro control transformer 10(CT) to the rotor 14 of the synchro transmitter 11, in the same manner as that shown in FIGURE 1.

The voltage generated by the generator end of the motor generator 23 is fed back to the amplifier 65 in the same manner, and for the same purpose as in the circuit shown in FIGURE 1.

The stationary field coils 25, 26, 27 of the synchro transmitter 11(CX) are substantially the same as those shown in FIGURE 1.

An auxiliary synchro transmitter 66(CX) is mounted on an index stand 67.

The stationary field of the auxiliary synchro transmitter 66 consists of three Y-connected coils 68, 69, 70.

The armature rotor 71 of the auxiliary synchro transmitter 66 is also substantially the same as that of the synchro transmitter 11, the rotor being fed by a rated voltage from an external source 72.

The shaft of the armature rotor 71 of the auxiliary synchro transmitter 66 is directly coupled to the rotating element of the index stand, so that it can rotate with the index stand 67.

The voltage distribution through the field coils 68, 69, 70 of the auxiliary synchro transmitter 66(CX) is controlled by the angular position of the armature rotor 71 of the auxiliary synchro transmitter, which is established by the adjusted position of the index stand 67. As the field coils 68, 69, 70 of the auxiliary synchro transmitter 66(CX) are directly coupled to the mating field coils 17, 18, 19 of the synchro control transformer 10(CT), the voltage distribution through the field coils 17, 18, 19 of the synchro transformer 10(CT) is substantially the same as that through the field coils 68, 69, 70 of the auxiliary synchro transmitter 66(CX).

A double-throw, three-pole switch 73, 74, 75 is inserted into the line between a synchro resistance bridge 76, and the field coils of the synchro control transformer 10(CT) and the synchro transmitter 11(CX) respectively, the operation of the circuit under control of the two sets of poles of the switch 73, 74, 75 being hereinafter described in greater detail.

In the position shown in FIGURE 5 the one set of terminals 73a, 74a, 75a of the switch, is connected to a set of three lines 78, 79, 80, which serve to connect the field coils 68, 69, 70 of the auxiliary synchro transmitter with the corresponding field coils 17, 18, 19 of the synchro control transformer 10(CT).

A synchro resistance bridge 76 is connected to the central terminals of the switch 73, 74, 75, a phase sensitive voltmeter 36 being connected to the synchro bridge, the voltmeter being substantially the same as that shown in FIGURE 1, the voltmeter functioning in substantially the same manner as that shown in FIGURE 1, as hereinafter described in greater detail.

*Operation*

With the three poles 73, 74, 75, of the switch in the position shown in FIGURE 5, in engagement with the terminals 73a, 74a, 75a, the synchro resistance bridge 76 is set to a position corresponding to the angular position of the synchro transmitter rotor 71 at which the angle error of the unit under test is to be determined.

The index stand 67 is rotated until a null reading is obtained on the phase sensitive voltmeter 36.

The three poles 73, 74, 75 of the switch are then moved into the position opposite that shown in FIGURE 5, the poles 73, 74, 75 being in engagement with the other set of terminals 73b, 74b, 75b, shown in FIGURE 5. In this position, the terminals 73b, 74b, 75b, of the switch are connected to the three field coils 25, 26, 27 of the synchro transmitter 11(CX).

The index stand 67 is again rotated until a null reading is obtained on the phase sensitive voltmeter. The angular movement of the index stand from the adjusted angular position at the start of the test to the angular position at which a null voltage reading is obtained, is the transmission angular error of the synchro servo system under test.

FIGURE 6 shows another variation of the circuits shown in FIGURES 1, 3, 4, and 5, which is used for testing individual synchros, such as the synchro transmitter 11(CX) shown in FIGURE 6.

The synchro transmitter 11(CX) under test is similar to that shown in FIGURE 1, but is now not part of a servo system.

The stationary field of the synchro transmitter 11(CX) under test consists of three Y-connected coils 25, 26, 27, similar to those shown in FIGURE 1.

The rated voltage from an external source 29, is fed to the armature rotor 14, of the synchro transmitter 11(CX), thus energizing the armature rotor 14. The method of establishing the angular position of the armature rotor during a test is hereinafter described in greater detail.

Potentiometer 83 is used as a reference device for potentiometer 30 which is part of a servo loop which in turn maintains the transfer constant of potentiometer 30 to be equal to that of synchro 11. The difference between the transfer constants of potentiometer 30 and 83 is representative of the angular error of the synchro, and is proportional to the difference in voltage between contacts 35 and 84.

The servo loop input is from the adjustable rotary contact 35, of the potentiometer 30 to the third field coil 27 of the synchro transmitter. The servo loop consists of a phase sensitive amplifier 85, and motor generator 87.

The rotary contact arm 35 of the potentiometer 30 is directly coupled to and driven by the motor of the motor generator 87, thus accurately positioning the slider 35 to correspond with the output of 27.

The difference in voltage between contacts 35 and 84 represent the error signal, and is amplified by amplifier 88, the output of which is sent to the Y-axis input 89 of a recorder, thus yielding the input to the error axis plotter 90.

Due to the fact that the potentiometers 30, 83, operate over a synchro angular range of 60°, while the synchro transmitter rotor 14 rotates through 360°, a reduction drive is necessary between the rotary contact arm 84 of the reference potentiometer 83 and the armature rotor 14 of the synchro transmitter 11 under test. As the reference potentiometer has N turns, the necessary reduction between the rotary contact arm 84 of the potentiometer 83 and the armature rotor 14 of the synchro transmitter 11 is 6N:1.

A worm driven speed reducer 92 having a reduction of 6N:1 is therefore incorporated between the shaft 93 which drives the synchro armature rotor 14 and the shaft 94 which drives the rotary contact arm 84 of the reference potentiometer 83.

The shaft 95 which drives the worm reduction gear 92 is driven by an externally controlled input drive, which is operative to angularly position the armature rotor 14 of the synchro transmitter 11, and also the adjustable rotary contact arm 84 of the reference potentiometer 83.

The shafts 94, 95 are also used to drive a $\theta$ axis or X-axis plotter 96, thus providing a continuing relationship between the angular arc $\theta$ and the error angle of the synchro under test in substantially the same manner as that shown in FIGURE 4.

A switching mechanism 97 similar to that shown in FIGURE 1, is incorporated into the lines 98, 99, 86, thus establishing the 60° angular range over which a particular synchro test is to be conducted in substantially the same manner as that shown in FIGURE 1 and hereinbefore described in greater detail.

The schematic circuit shown in FIGURE 6, with minor modification, can be utilized for determining the electrical angular error of synchro receivers, and synchro resolvers, in substantially the same manner as that shown in FIGURE 6 and hereinbefore described, the angular errors being plotted automatically and continuously throughout the range of 0° to 360° of synchro rotor shaft rotation.

In essence, the fundamental operation of the circuit shown in FIGURE 6 is substantially as follows:

The auxiliary reference potentiometer 83 is used as a reference device for the primary potentiometer 30, which is part of a servo loop which co-ordinates the angular position of the rotary contact arm 35, with the angular position of the synchro 11.

The difference between the angular position of the potentiometer 30 and the reference potentiometer 83 is therefore the angular error of the synchro under test, the angular error being sent to the error axis plotter 90 and recorded in the manner hereinbefore described.

FIGURE 7 shows a modification of the circuit shown in FIGURE 6, which is also used for determining the angular transmission error of a synchro.

In place of the two potentiometers shown in FIGURE 6, a single potentiometer 101 fitted with a rotatable stator 101a is substituted.

The synchro transmitter 11(CX) under test is substantially the same as that shown in FIGURES 1 and 6. The stationary field of the synchro transmitter is substantially the same as that shown in FIGURE 6.

The ends of the rotary stator 101 of the potentiometer are connected to two of the field coils 25, 26 of the synchro transmitter 11(CX) under test. The voltage difference between adjustable sliding contact arm 102 of the potentiometer 101 and the third field coil 27 of the synchro transmitter 11 on line 86, is sent to amplifier 85.

The rated voltage from an external source 29 is fed to the armature rotor 14 of the synchro transmitter 11(CX) in the same manner as that shown in FIGURE 6.

The field coils 25, 26, 27 of the synchro transmitter stator are energized by the voltage from the armature rotor 14, the distribution of the voltage through the field coils 25, 26, 27, being controlled by the angular position of the armature rotor 14, in the same manner as that shown in FIGURE 6. Two of the field coils 25, 26 of the synchro transmitter are connected to the ends of potentiometer 101.

The stator coil 101 of the potentiometer is therefore energized by the field coils 25, 26 of the synchro stator.

The servo loop inputs are the adjustable slider 102 of the potentiometer 101 and line 86 which extends from the third field coil 27 of the synchro transmitter 11(CX). The servo loop consists of a phase sensitive amplifier 85, whose input is from line 86 to line 102, and whose output drives a motor generator 87.

The slider 102 of the potentiometer 101 is directly coupled to and driven by the motor of the motor generator 87, thus accurately positioning the adjustable slider 102 of the potentiometer until its voltage output matches that of line 86.

The shaft of the motor generator 87 also drives an error axis plotter input 104, which is similar to that shown in FIGURE 6.

The rotor armature 14 of the synchro transmitter 11(CX) under test is energized by the rated voltage from an external source 29 in substantially the same manner as that shown in FIGURE 6.

The potentiometer 101 operates over a 60° angle or range of the rotation of the synchro transmitter rotor, in the same manner as that shown in FIGURE 6.

The rotating stator of the potentiometer 101 has N turns, similar to that shown in FIGURE 6.

The necessary reduction between the rotary stator 101a of the potentiometer 101 and the armature rotor 14 of the synchro transmitter is therefore 6N:1 in the same manner as that shown in FIGURE 6.

A worm driven speed reducer 92 having a reduction of 6N:1 is therefore incorporated between the shaft 105 which drives the rotating stator 101a of the potentiometer 101, and the shaft 93 which drives the synchro transmitter armature rotor 14 in the same manner as that shown in FIGURE 6.

The shaft 106 which drives the worm driven speed reducer 92, is driven by a motor 107 which is controlled by an externally controlled input drive, the motor 107 being operative to angularly position the armature rotor 14 of the synchro transmitter 11(CX) and also the adjustable rotary stator 101a of the potentiometer 101, to coordinate them in the same manner as in the circuit shown in FIGURE 6.

The motor 107 is also used to drive an X-axis plotter 96 in the same manner as that shown in FIGURE 6.

A switching circuit 97 similar to that shown in FIGURE 6 is incorporated into the lines 98, 99, 86 connecting the field coils 25, 26, 27 of the synchro transmitter, with the potentiometer 101, and the slider 102 thereof, thus establishing the 60° angular range over which a particular synchro test is to be conducted in substantially the same manner as that shown in FIGURE 1 and FIGURE 6 and hereinbefore described.

The N-turn potentiometer 101 is used as a "differential potentiometer," such that the slider 102 thereof is always at the error angle with respect to the rotating stator 101a of the potentiometer 101.

It will be apparent to those skilled in the art, that the present invention is not limited to the specific details described above and shown in the drawings, and that various modifications are possible in carrying out the features of the invention and the operation and the method of control, connection, metering and utilization thereof, without departing from the spirit and scope of the appended claims.

What is claimed is:

1. A testing apparatus for determining the electrical error angle of transmission of a synchro servo system, including a driving synchro having a stator fitted with a plurality of radially positioned interconnected coils and a rotor concentric with the stator, and a driven synchro having a stator fitted with a plurality of radially positioned interconnected coils and a rotor, and including means controlled by the driving synchro operative to uniformly angularly position the rotors of the driving and driven synchros, relative to the electrical angular relation of the coils of the driving syncho stator, comprising primary simulating means electrically connected to the coils of the stator of the driving synchro to electrically simulate the rotational angular position of the rotor of the driving synchro, said primary reference means being a low-resistance high resolution excitation potentiometer, said potentiometer serving as an excitation device for the synchro servo system control transformer input, and an auxiliary reference mechanism selectively connected to the primary simulating means and to predetermined stator coils of the driven synchro, said auxiliary reference mechanism having a movable adjustment member incorporated therewith, operative to vary the voltage through the auxiliary reference mechanism, said auxiliary reference mechanism being a high resistance, high linearity potentiometer, switch means adapted to selectively directly couple the reference potentiometer with an excitation potentiometer, means operative to selectively transfer the electrical connections from the primary simulating means to the stator coils of the driven synchro, and means operative to selectively measure the voltage differential from the primary simulating means to the auxiliary reference mechanism to indicate the electrical angular error of transmission of the synchro servo system.

2. A testing apparatus for use in testing a synchro servo system for determining the electrical error angle of transmission of said system, the synchro servo system including a synchro control transformer and a synchro transmitter, with a motor generator unit driven by amplified voltage received from the rotor of the synchro transformer, directly coupled to the rotors of the synchro transformer and the synchro transmitter, to uniformly angularly position said rotors, relative to the stators of the synchros, comprising means connected to the stator of the synchro transformer and adapted to electrically simulate the angular position of the rotor of the synchro transformer, said primary reference means being low resistance, high resolution excitation potentiometer, said potentiometer serving as an excitation device for the synchro servo system control transformer input, an auxiliary reference means selectively connected to the primary simulating means and to the stator of the synchro transmitter, said auxiliary reference means having an adjustable contact incorporated therewith operative to vary the voltage of said auxiliary reference means, said auxiliary reference means being a high resistance, high linearity potentiometer, and switch means operative to selectively shift the electrical connections to the auxiliary reference means from the primary simulating means to the stator of the synchro transmitter, and means operative to selectively meter the voltage from the reference means to the primary simulating means and then to the synchro transmitter to indicate the electrical angular error of transmission of the synchro servo system.

3. A testing apparatus for use in testing a synchro servo system for determining the electrical error angle of transmission of said system, the synchro servo system including a synchro control transformer and a synchro transmitter, with a motor generator unit driven by amplified voltage received from the rotor of the synchro transformer, directly coupled to the rotors of the synchro transformer and the synchro transmitter, to uniformly angularly position said rotors relative to the stators of the synchros, comprising means connected to the stator of the synchro transformer adapted to electrically simulate the angular position of the rotor of the synchro transformer, said electrical simulating means being a low-resistance high resolution potentiometer, said potentiometer serving as an excitation device for the synchro servo system control transformer input, an auxiliary reference means selectively connected to the primary simulating means and to the stator of the synchro transmitter, said auxiliary reference means having an adjustable contact incorporated therewith operative to vary the voltage of said auxiliary reference means, said auxiliary reference means being a high resistance, high linearity potentiometer, switch means operative to selectively shift the electrical connections to the auxiliary reference means from the primary simulating means to the stator of the synchro transmitter, and means operative to selectively measure the angular differential from the primary simulating means to the auxiliary reference means to indicate the electrical angular error of transmission of the synchro servo system.

4. A testing apparatus for use in testing a synchro servo system including a synchro control transformer and a synchro transmitter, for determining the electrical error angle of transmission of said system, said synchro transformer and synchro transmitter each having a multiple coil Y-connected stator, and a rotor concentric with the stator, with means driven by the voltage from the rotor of the synchro transformer, directly coupling the rotors of the synchro transmitter and the synchro control transformer, to uniformly angularly position said rotors relative to the respective stators of the synchros, comprising means electrically connected to the stator of the synchro transformer, operative to electrically simulate the rotational angular position of the rotor of a synchro transmitter, said electrical simulating means being a low-resistance high resolution potentiometer, said potentiometer serving as an excitation device for the synchro servo system control transformer input, an auxiliary reference means selectively connected to the primary simulating means and to the stator of the synchro transmitter, said auxiliary reference means having an adjustable contact incorporated therewith operative to vary the voltage through the auxiliary reference means, said auxiliary reference means being a high resistance, high linearity potentiometer, switch means operative to selectively shift the electrical connections to the auxiliary reference means, from the primary simulating means to the stator coils of the synchro transmitter, and means operative to selectively measure and record the voltage differential from the primary simulating means to the auxiliary reference means, to indicate and record the electrical angular error of transmission of the synchro servo system.

5. A testing apparatus for use in determining the electrical error angle of transmission in a synchro servo system, including a driving synchro having a stator including a plurality of Y-connected coils and a rotor, and a driven synchro having a stator including a plurality of Y-connected coils and a rotor, said servo system including means controlled by the driving synchro rotor operative to uniformly angularly position the rotors of the driving and driven synchros co-ordinated with the electrical angular relation to the stator coils of the driving synchro, comprising primary means electrically connected to the driving synchro operative to electrically simulate the rotational angular position of the rotor of the driving synchro, said electrical simulating means being a low-resistance high resolution potentiometer, said potentiometer serving as an excitation device for the synchro servo system control transformer input, an auxiliary reference means selectively connected to the primary angle simulating means and to the stator coils of the driven synchro, said auxiliary reference means having an adjustable contact member incorporated therewith, operative to vary the voltage of the auxiliary reference means, said auxiliary reference means being a high resistance, high linearity potentiometer, switch means operative to selectively transfer the electrical connections to the auxiliary reference means, from the primary simulating means to the stator coils of the driven synchro, and means operative to selectively measure and record the voltage differential between the primary simulating means and the auxiliary reference means, to indicate and record the electrical angular error of transmission of the synchro servo system.

6. A testing apparatus for use in testing a synchro servo system for determining the electrical error angle of transmission of said system, the synchro servo system including a synchro control transformer and a synchro transmitter, the rotors of which are directly coupled to one another, with a motor generator driven by amplified voltage received from the rotor of the synchro transformer directly coupled to the rotors of the synchro control transformer and the synchro transmitter to angularly position said rotors relative to the stators of the synchros, comprising a low resistance, high resolution excitation potentiometer connected to the stator of the synchro transformer, said potentiometer being adapted to simulate the angular position of the rotor of the synchro transformer, an auxiliary reference potentiometer selectively connected to the primary potentiometer, and to the field coils of the synchro transmitter, said auxiliary reference potentiometer being a high resistance, high resolution, high linearity potentiometer, said auxiliary reference potentiometer having a sliding contact operative to vary the voltage of the potentiometer, a double throw switching means adapted to selectively shift the connections to the auxiliary reference potentiometer from the primary potentiometer to the field coils of the synchro transmitter, and means operative to selectively meter and null the voltage from the primary potentiometer and the synchro transmitter to the reference potentiometer to indicate the electrical angular error of transmission of the synchro servo system.

7. A testing apparatus for use in testing a synchro servo system for determining the electrical error angle of transmission of said system, the synchro servo system including a synchro control transformer and a synchro transmitter, each of said synchros having a stator fitted with a plurality of radially located Y-connected field coils, and a rotor concentric with the stator, the rotors of said synchros being directly coupled to one another, with a motor generator driven by amplified voltage received from the rotor of the synchro control transformer directly coupled to the rotors of the synchro control transformer and the synchro transmitter to angularly position said rotors relative to the stators of the synchros, comprising a primary potentiometer electrically connected to the stator of the synchro control transformer, said primary potentiometer being a low resistance, high resolution excitation potentiometer, said primary potentiometer being operative to electrically simulate the rotational angular position of the rotor of the synchro transformer, an auxiliary reference potentiometer selectively connected to the primary potentiometer, and to the field coils of the synchro transmitter, said auxiliary reference potentiometer being a high resistance, high resolution, high linearity potentiometer, said auxiliary reference potentiometer having a sliding contact adapted to vary the voltage through the auxiliary potentiometer, a double throw switching means operative to selectively shift the connections to the auxiliary reference potentiometer from the primary potentiometer to the field coils of the synchro transmitter, and means operative to selectively measure the differential from the primary potentiometer and the secondary potentiometer to indicate the electrical angular error of transmission of the synchro servo system.

8. A testing apparatus for use in determining and recording the electrical error angle of transmission in a synchro servo system, including a driving synchro having a stator including a plurality of Y-connected field coils, and a rotor, and a driven synchro having a stator including a plurality of Y-connected field coils, and a rotor, said servo system including means controlled by the rotor of the driving synchro operative to uniformly angularly position the rotors of the driving and driven synchros, co-ordinated with the electrical angular relation of the stator field coils of the driving synchro; comprising a primary potentiometer electrically connected to two of the field coils of the stator of the driving synchro, operative to electrically simulate the rotational angular position of the rotor of the driving synchro, said primary potentiometer being a low resistance, high resolution excitation potentiometer, a combination switching and recording control means including two elements, a first element electrically connected to the primary angle simulating means, and a second element electrically connected to two of the field coils of the driven synchro, co-ordinated with the synchro servo system and the angle simulating means, a pair of adjusting members operative to individually control the voltage through said first and second elements, coupling means operative to co-ordinate the adjusted positions of the adjusting members of the first and second elements, externally controlled means operative to adjust the relative position of the coupling means, and the adjusted position of the adjusting members relative to the first and second elements of the switching and recording control means, a recording control servo loop controlled by the adjusting member of the second element, and a voltage measuring and recording device controlled by the recording control servo loop, adapted to measure the voltage differential between the stator coils of the driven synchro, and the second element of the combination switching and recording control means, to indicate and record the electrical error angle of the synchro servo system under test.

9. An apparatus for determining and recording the electrical error angle of a synchro, said synchro including a stator having a plurality of Y-connected field coils and a rotor concentric with the stator, comprising a primary potentiometer including a coil electrically connected to two of the stator field coils of the synchro, said primary potentiometer being operative to electrically simulate the angular position of the rotor of the synchro under test relative to the stator thereof, a first adjustable contact member operative to regulate the voltage through the primary potentiometer, said primary potentiometer being a low resistance, high resolution excitation potentiometer, a servo system connected between one of the stator coils of the synchro under test and the first adjustable contact member, operative to adjust the position of the adjustable contact member to co-ordinate the voltage through the primary potentiometer with the angular voltage distribution through the synchro stator field coils, an external electrical source adapted to energize the armature rotor of the synchro, an auxiliary reference potentiometer having a coil connected to the coil of the primary potentiometer, a second adjustable contact member incorporated with the auxiliary reference potentiometer to adjust the voltage through the auxiliary reference potentiometer, means mechanically coupling the second adjustable contact member with the rotor of the synchro to co-ordinate the rotational angular position of the synchro rotor, relative to the adjusted position of the second adjustable contact member, externally controlled means operative to establish the rotational angular position of the synchro rotor and simultaneously adjust the position of the second adjustable contact member relative to the coil of the auxiliary reference potentiometer, and means electrically controlled by the relative positions of the first and second adjustable contact members operative to indicate the electrical angular error between the established angular position of the synchro rotor, and the corresponding angular position induced in the stator field coils of the synchro under test.

10. An apparatus for determining and recording the electrical error angle of a synchro including a stator having a plurality of Y-connected field coils and a rotor concentric with the stator, comprising a primary simulating means electrically connected to two of the field coils of the stator of the synchro, to electrically simulate the rotational angular position of the rotor of the synchro, an auxiliary reference mechanism electrically connected to the primary simulating means, and to the stator field coils of the synchro, the primary simulating means having a first adjustable contact incorporated therewith adapted to vary the voltage through the primary simulating means, the primary simulating means being a low resistance, high resolution potentiometer, said potentiometer being adapted to serve as an excitation device for the synchro servo system control transformer input, the auxiliary reference mechanism having a second adjustable contact incorporated therewith, operative to vary the voltage through the auxiliary reference mechanism, said auxiliary reference mechanism being a high resistance, high linearity potentiometer, a servo loop incorporated between one field coil of the synchro stator and the first adjustable contact to adjust the position of the adjustable contact in order to co-ordinate the voltage through the primary simulating means with the voltage distribution through the synchro stator field coils, an external electrical source adapted to energize the armature rotor of the synchro, means mechanically coupling the second adjustable contact with the rotor of the synchro under test to co-ordinate the rotational angular position of the synchro rotor relative to the adjusted position of the second adjustable contact, externally controlled means operative to establish the rotational angular test position of the synchro rotor and simultaneously adjust the position of the second adjustable contact relative to the auxiliary reference mechanism, and means electrically controlled by the first and second adjustable contacts adapted to indicate and record the angular error between the established angular position of the synchro rotor, and the corresponding electrical angular position induced in the stator field coils of the synchro under test.

11. An apparatus for determining and recording the electrical error angle of a synchro, said synchro including a stator having a plurality of Y-connected field coils, and a rotor; comprising a primary potentiometer, including a rotatable stator and an adjustable contact member incorporated with the potentiometer, the rotatable stator of the potentiometer being connected to two of the field coils of the synchro, the primary potentiometer being a low resistance, high resolution potentiometer, said potentiometer being adapted to electrically simulate the angular position of the rotor of the synchro under test relative to the stator thereof, the adjustable contact member being adapted to regulate the voltage through the potentiometer, a servo loop, connected between one of the coils of the stator of the synchro under test and the adjustable contact member, adapted to adjust the position of the adjustable contact member relative to the rotary stator of the potentiometer to co-ordinate the voltage through the potentiometer with the angular voltage distribution through the synchro stator field coils, an external electrical source operative to energize the armature rotor of the synchro, means mechanically coupling the rotatable stator of the potentiometer with the rotor of the synchro to co-ordinate the rotational angular position of the synchro rotor, relative to the adjusted position of the adjustable contact member, the mechanical coupling means having a reduction member incorporated therewith adapted to co-ordinate the rate of rotation of the rotatable stator coil of the potentiometer with the rotor of the synchro, exernally controlled means operative to establish the rotational angular position of the synchro rotor and simultaneously correspondingly adjust the rotational angular position of the rotatable stator coil of the potentiometer, and means controlled by the servo loop operative to indicate and record the electrical angular error between the established angular position of the synchro rotor and the corresponding angular position induced in the stator field coils of the synchro under test.

References Cited in the file of this patent

UNITED STATES PATENTS

| | | |
|---|---|---|
| 2,237,225 | Heuschmann | Apr. 1, 1941 |
| 2,402,108 | Willard | June 11, 1946 |
| 2,473,682 | Harris et al. | June 21, 1949 |
| 2,508,424 | Rouy | May 23, 1950 |
| 2,625,599 | Downes | Jan. 13, 1953 |
| 2,692,814 | Mathes et al. | Oct. 26, 1954 |
| 2,726,382 | Bell | Dec. 6, 1955 |
| 2,772,412 | Weiher | Nov. 27, 1956 |
| 2,841,768 | Robinson | July 1, 1958 |
| 2,966,669 | Walker et al. | Dec. 27, 1960 |